United States Patent
Tsuchida et al.

(10) Patent No.: US 8,557,412 B2
(45) Date of Patent: Oct. 15, 2013

(54) METHOD FOR PROCESSING BATTERY MEMBER COMPRISING LITHIUM-CONTAINING ELECTRODE AND ELECTROLYTE MATERIALS AND A PROCESS SOLUTION

(75) Inventors: Yasushi Tsuchida, Susono (JP);
Yukinari Kotani, Susono (JP);
Yukiyoshi Ueno, Gotenba (JP);
Shigenori Hama, Susono (JP);
Hirofumi Nakamoto, Susono (JP);
Hiroshi Nagase, Susono (JP); Masato Kamiya, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/673,911

(22) PCT Filed: Mar. 16, 2009

(86) PCT No.: PCT/JP2009/055053
§ 371 (c)(1),
(2), (4) Date: May 25, 2010

(87) PCT Pub. No.: WO2010/106618
PCT Pub. Date: Sep. 23, 2010

(65) Prior Publication Data
US 2012/0091391 A1    Apr. 19, 2012

(51) Int. Cl.
H01M 10/0562    (2010.01)
H01M 4/40    (2006.01)
C01D 15/00    (2006.01)
B01J 19/00    (2006.01)
B23P 19/00    (2006.01)

(52) U.S. Cl.
USPC ..... 429/49; 429/231.95; 429/322; 423/179.5; 422/129; 264/37.1; 29/763

(58) Field of Classification Search
USPC ................ 429/8, 49, 322, 231.95; 432/179.5; 422/129; 264/37.1; 29/700, 763
See application file for complete search history.

(56) References Cited

U.S. PATENT DOCUMENTS 2,580,681 A * 1/1952 Konrad et al. ................. 205/593
5,491,037 A * 2/1996 Kawakami ...................... 429/49

(Continued)

FOREIGN PATENT DOCUMENTS

JP    A-09-082371    3/1997
JP    A-11-185833    7/1999

(Continued)

OTHER PUBLICATIONS

International Search Report issued in International Application No. PCT/JP2009/055053 on Jun. 23, 2009 (with English-language translation).

*Primary Examiner* — Kenneth Douyette
(74) *Attorney, Agent, or Firm* — Oliff & Berridge, PLC (57) ABSTRACT

It is a major object of the invention to provide a method for processing a battery member, by which a cathode active material and a sulfide solid electrolyte material can be efficiently separated from each other and the cathode active material and Li contained in the sulfide solid electrolyte material can be efficiently recovered. To achieve the object, the present invention provides a method for processing a battery member containing at least a Li-containing cathode active material and a Li-containing sulfide solid electrolyte material, comprising the steps of: bringing the battery member into contact with a process solution to generate hydrogen sulfide as well as to dissolve the Li contained in the sulfide solid electrolyte material in the process solution; recovering the cathode active material as an insoluble component from the process solution containing the Li dissolved therein; and recovering a Li compound from the process solution, from which the cathode active material as an insoluble component is recovered.

13 Claims, 4 Drawing Sheets

(56) References Cited

U.S. PATENT DOCUMENTS

| | | | |
|---|---|---|---|
| 5,789,095 A * | 8/1998 | Miyagawa et al. | 429/49 |
| 5,882,811 A * | 3/1999 | Kawakami | 429/49 |
| 6,261,712 B1 * | 7/2001 | Hayashi et al. | 429/49 |
| 2003/0180604 A1* | 9/2003 | Zenger et al. | 429/49 |
| 2010/0159318 A1* | 6/2010 | Sato et al. | 429/129 |

FOREIGN PATENT DOCUMENTS

| | | |
|---|---|---|
| JP | B2-3015423 | 3/2000 |
| JP | A-2003-027151 | 1/2003 |
| JP | A-2007-122885 | 5/2007 |
| JP | A-2007-323868 | 12/2007 |
| JP | A-2010-040458 | 2/2010 |
| WO | WO-2008/140120 A1 * | 11/2008 |

* cited by examiner

METHOD FOR PROCESSING BATTERY MEMBER COMPRISING LITHIUM-CONTAINING ELECTRODE AND ELECTROLYTE MATERIALS AND A PROCESS SOLUTION

TECHNICAL FIELD

The present invention relates to a method for processing a battery member, by which a cathode active material and a sulfide solid electrolyte material can be efficiently separated from each other, and the cathode active material and Li contained in the sulfide solid electrolyte material can be efficiently recovered.

BACKGROUND ART

In recent years, information technology-related devices and communication devices such as personal computers, video cameras, and mobile phones have rapidly become popular, and therefore importance is placed on the development of batteries (e.g., lithium batteries) excellent as power sources of such devices. Further, in industrial fields other than the fields of information technology-related devices and communications-related devices, for example, in the field of automobile industry, lithium batteries for use in electric cars and hybrid cars are being developed.

Conventional commercially-available lithium batteries use an organic liquid electrolyte containing a flammable organic solvent, and therefore need to have a safety device that suppresses temperature rise during short circuit and to be improved in structure and material to prevent short circuit. On the other hand, solid-state batteries using a solid electrolyte instead of a liquid electrolyte have no flammable organic solvent therein, and therefore their safety devices can be simplified. For this reason, it is believed that such solid-state batteries are advantageous in terms of production cost and productivity. Among various solid-state batteries, solid-state batteries using a sulfide solid electrolyte material are advantageous in that they have excellent Li ion conductivity.

Meanwhile, various conventional methods for processing used batteries which are past their useful lives are known. For example, Patent Document 1 discloses a method for processing a Na—S battery using a solid electrolyte, in which Na is melted in a hot liquefied wax and the melted Na is taken out of the battery. Further, Patent Document 2 discloses a method for separating, for example, Co and Cu contained in a used lithium battery from each other by utilizing factors such as the difference in magnetic properties between them. Further, Patent Document 3 discloses a method for separating and recovering Co and Li from an electrode material, in which the electrode material containing Co and Li is dissolved in sulfuric acid and then Co and Li are separated and recovered from insoluble matter. Further, Patent Document 4 discloses a method for efficiently separating and recovering valuable metals from a used lithium battery by using a solution such as an acidic solution.

Patent Document 1: Japanese Patent No. 3015423
Patent Document 2: Japanese Patent Application Laid-Open (JP-A) No. Hei 11-185833
Patent Document 3: JP-A No. 2003-27151
Patent Document 4: JP-A No. 2007-122885

DISCLOSURE OF THE INVENTION

Problem to be Solved by the Invention

As described above, there are various known methods for processing used batteries, but the reality is that a used-battery processing method suitable for the properties of a solid-state battery using a sulfide solid electrolyte material is not known. In view of the circumstances, it is a main object of the present invention to provide a method for processing a battery member, by which a cathode active material and a sulfide solid electrolyte material can be efficiently separated from each other, and the cathode active material and Li contained in the sulfide solid electrolyte material can be efficiently recovered.

Means for Solving the Problem

In order to achieve the above object, the present invention provides a method for processing a battery member containing at least a Li-containing cathode active material and a Li-containing sulfide solid electrolyte material, the method comprising the steps of: bringing the battery member into contact with a process solution to generate hydrogen sulfide as well as to dissolve the Li contained in the sulfide solid electrolyte material in the process solution; recovering the cathode active material as an insoluble component from the process solution containing Li dissolved therein; and recovering a Li compound from the process solution, from which the cathode active material as the insoluble component is recovered.

According to the present invention, a battery member is brought into contact with a process solution, which makes it possible to dissolve the Li contained in a sulfide solid electrolyte material in the process solution without dissolving the Li contained in the cathode active material in the process solution. This makes it possible to efficiently separate the cathode active material and the sulfide solid electrolyte material from each other as well as to efficiently recover the cathode active material and the Li contained in the sulfide solid electrolyte material.

In the present invention, the contact step is preferably performed by immersing the battery member in the process solution. This makes it possible to increase the area of contact between the battery member and the process solution, thereby enabling the Li contained in the sulfide solid electrolyte material to be efficiently dissolved in the process solution.

The method according to the present invention preferably further comprises a step of recovering hydrogen sulfide generated in the contact step. By recovering gas-phase hydrogen sulfide, it is possible to further improve the recovery rates of useful components.

In the present invention, the process solution is preferably water. This makes it easy to handle the process solution and to dissolve Li contained in the sulfide solid electrolyte material in the process solution.

In the present invention, the sulfide solid electrolyte material is preferably a $Li_2S$—$P_2S_5$ compound. This is because a $Li_2S$—$P_2S_5$ compound has high Li ion conductivity.

In the present invention, the battery member may be: a cathode active material layer containing the cathode active material and the sulfide solid electrolyte material, or a member having a cathode active material layer containing the cathode active material, a sulfide solid electrolyte layer containing the sulfide solid electrolyte material, and an anode active material layer containing an anode active material.

In the present invention, there is provided a method for producing a regenerated cathode active material, comprising the steps of: bringing a battery member containing at least a Li-containing cathode active material and a Li-containing sulfide solid electrolyte material into contact with a process solution to generate hydrogen sulfide as well as to dissolve the Li contained in the sulfide solid electrolyte material in the process solution; and recovering the cathode active material as an insoluble component from the process solution containing Li dissolved therein to obtain a regenerated cathode active material.

According to the present invention, a battery member is brought into contact with a process solution, which makes it possible to dissolve the Li contained in a sulfide solid electrolyte material in the process solution without dissolving the Li contained in the cathode active material in the process solution. This makes it possible to efficiently separate the cathode active material and the sulfide solid electrolyte material from each other, thereby enabling a regenerated cathode active material to be efficiently obtained.

In the present invention, there is provided an apparatus for processing a battery member containing at least a Li-containing cathode active material and a Li-containing sulfide solid electrolyte material, the apparatus comprising: an immersion unit filled with a process solution in which the battery member is to be immersed; and a hydrogen sulfide recovery unit which recovers hydrogen sulfide generated by reaction between the process solution and the battery member.

The apparatus according to the present invention has an immersion unit and a hydrogen sulfide recovery unit, which makes it possible to efficiently separate a cathode active material and a sulfide solid electrolyte material from each other as well as to efficiently recover the cathode active material and the Li contained in the sulfide solid electrolyte material.

Effect of the Invention

According to the present invention, it is possible to efficiently separate a cathode active material and a sulfide solid electrolyte material from each other as well as to efficiently recover the cathode active material and the Li contained in the sulfide solid electrolyte material.

DESCRIPTION OF THE REFERENCE NUMERALS 1 battery member
2 process solution
3 filter
4 lithium hydroxide
5 aprotic solvent
11 immersion unit
12 cathode active material recovery unit
13 hydrogen sulfide recovery unit
14 connection unit

BEST MODE FOR CARRYING OUT THE INVENTION

Hereinbelow, a method for processing a battery member, a method for producing a regenerated cathode active material, and an apparatus for processing a battery member according to the present invention will be described in detail.

A. Method for Processing Battery Member

First, a method for processing a battery member according to the present invention will be described. The method for processing a battery member according to the present invention is a method for processing a battery member containing at least a Li-containing cathode active material and a Li-containing sulfide solid electrolyte material, comprising the steps of: bringing the battery member into contact with a process solution to generate hydrogen sulfide as well as to dissolve the Li contained in the sulfide solid electrolyte material in the process solution; recovering the cathode active material as an insoluble component from the process solution containing the Li dissolved therein; and recovering a Li compound from the process solution from which the cathode active material as the insoluble component is recovered.

According to the present invention, a battery member is brought into contact with a process solution, which makes it possible to dissolve the Li contained in a sulfide solid electrolyte material in the process solution without dissolving the Li contained in the cathode active material in the process solution. This makes it possible to efficiently separate the cathode active material and the sulfide solid electrolyte material from each other as well as to efficiently recover the cathode active material and the Li contained in the sulfide solid electrolyte material, thereby enabling useful components to be efficiently recovered from, for example, used batteries or battery members rejected as defective members during the production process. Meanwhile, it has been well known that when a sulfide solid electrolyte material reacts with water, hydrogen sulfide is generated. Since hydrogen sulfide is highly toxic, attention has heretofore been paid to techniques for preventing the generation of hydrogen sulfide. However, the present invention has focused attention on the fact that Li contained in a cathode active material is not dissolved in a process solution, but Li contained in a sulfide solid electrolyte material is dissolved in the process solution. Namely, the present invention achieves efficient separation and recovery by actively generating hydrogen sulfide, that is, by actively dissolving Li contained in a sulfide solid electrolyte material in a process solution.

Figure 1:
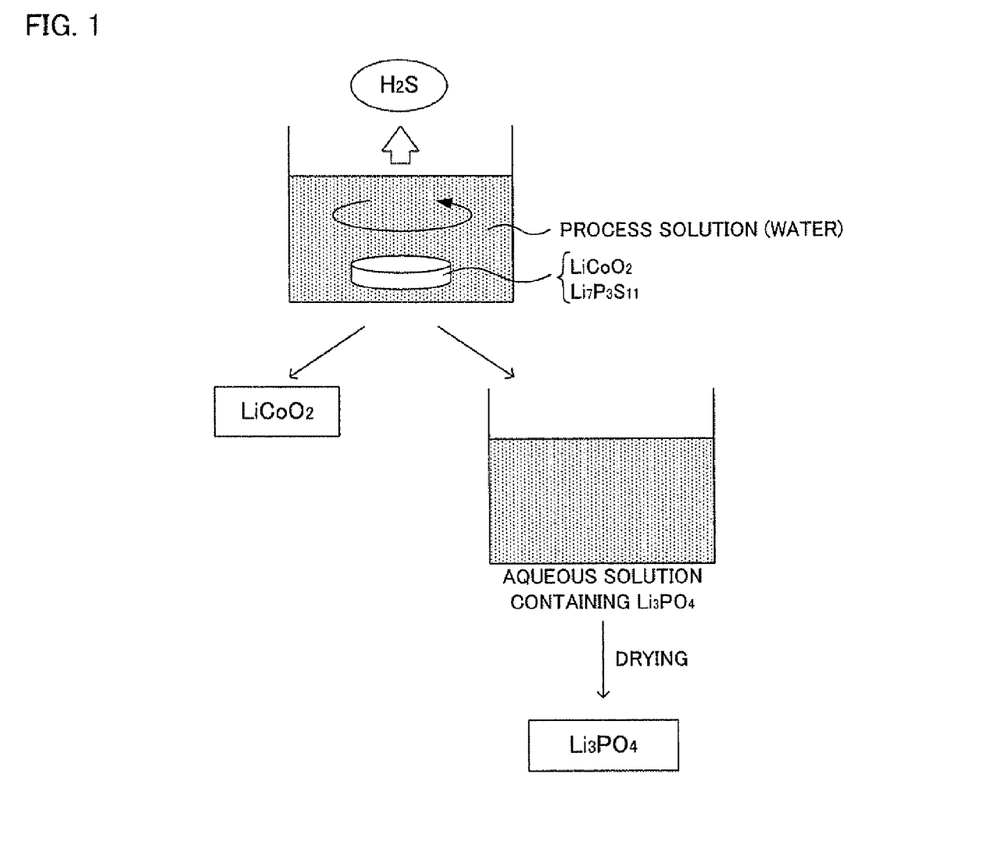
FIG. 1 is a schematic sectional view illustrating one example of a method for processing a battery member according to the present invention.

FIG. 1 is a schematic sectional view illustrating one example of the method for processing a battery member according to the present invention. According to the method for processing a battery member shown in FIG. 1, a battery member containing $LiCoO_2$ as a Li-containing cathode active material and $Li_7P_3S_{11}$ as a Li-containing sulfide solid electrolyte material is immersed and stirred in water as a process solution to generate hydrogen sulfide as well as to dissolve the Li contained in $Li_7P_3S_{11}$ in the process solution. Then, $LiCoO_2$ as an insoluble component is recovered from the process solution by filtration. The process solution, from which $LiCoO_2$ has been recovered, contains $Li_3PO_4$, and therefore $Li_3PO_4$ is recovered by removing water.

Hereinbelow, each of the steps of the method for processing a battery member according to the present invention will be described.

1. Contact Step

First, a contact step of the method according to the present invention will be described. This step is a step of bringing a battery member, into contact with a process solution to generate hydrogen sulfide as well as to dissolve Li contained in the sulfide solid electrolyte material in the process solution. It is to be noted that the method according to the present invention may further comprise the step of recovering hydrogen sulfide generated in the contact step, which will be described later in detail in "4. Hydrogen Sulfide Recovery Step".

(1) Battery Member

A battery member to be used in the present invention contains at least a Li-containing cathode active material and a Li-containing sulfide solid electrolyte material. The battery member may further contain at least one of a conductive material and an anode active material depending on its structure. First, materials constituting the battery member will be described. A cathode active material to be used in the present invention is not particularly limited as long as it contains Li, and is usually one containing Li insoluble in a process solution which will be described later. Particularly, in a case where the battery member is a member used in a solid-state lithium secondary battery, a cathode active material contained in the member usually needs to be able to absorb and release Li ions. Examples of such a cathode active material include a layered cathode active material, a spinel-type cathode active material, and an olivine-type cathode active material. Specific examples of the layered cathode active material include $LiCoO_2$, $LiNiO_2$, $LiCo_{1/3}Ni_{1/3}Mn_{1/3}O_2$, $LiVO_2$, and $LiCrO_2$. Specific examples of the spinel-type cathode active material include $LiMn_2O_4$, $LiCoMnO_4$, $Li_2NiMn_3O_8$, and $LiNi_{0.5}Mn_{1.5}O_4$. Specific examples of the olivine-type cathode active material include $LiCoPO_4$, $LiMnPO_4$, and $LiFePO_4$. The average particle size of the cathode active material is preferably in the range of, for example, 1 nm to 100 µm, particularly preferably in the range of 10 nm to 30 µm.

On the other hand, a sulfide solid electrolyte material to be used in the present invention is not particularly limited as long as it contains Li and S and has Li ion conductivity, and is usually one containing Li soluble in a process solution which will be described later. The sulfide solid electrolyte material is preferably one which does not generate an insoluble component by reaction with a process solution. This makes it easy to recover a cathode active material. Examples of the sulfide solid electrolyte material include ones containing Li, S, and a third component A. The third component A is, for example, at least one selected from the group consisting of P, Ge, B, Si, I, Al, Ga, and As. Among them, in the present invention, the sulfide solid electrolyte material is preferably a compound using $Li_2S$ and a sulfide MS other than $Li_2S$. Specific examples of such a compound include a $Li_2S$—$P_2S_5$ compound, a $Li_2S$—$SiS_2$ compound, and a $Li_2S$—$GeS_2$ compound. Among them, a $Li_2S$—$P_2S_5$ compound is preferred from the viewpoint of high Li ion conductivity. In a case where the molar ratio between $Li_2S$ and the sulfide MS is defined as $xLi_2S$-(100-x)MS, "x" preferably satisfies a relational expression of $50 \leq x \leq 95$, and more preferably satisfies a relational expression of $60 \leq x \leq 85$. It is to be noted that the term "$Li_2S$—$P_2S_5$ compound" refers to a sulfide solid electrolyte material using $Li_2S$ and $P_2S_5$. The same applies to the other compounds. For example, an amorphous $Li_2S$—$P_2S_5$ compound can be obtained by mechanical milling or rapid melt quenching using $Li_2S$ and $P_2S_5$.

The sulfide solid electrolyte material to be used in the present invention may be amorphous or crystalline. A crystalline sulfide solid electrolyte material can be obtained by, for example, firing an amorphous sulfide solid electrolyte material. Further, the sulfide solid electrolyte material to be used in the present invention preferably contains cross-linking sulfur. This makes it possible to improve the Li ion conductivity of the sulfide solid electrolyte material. Further, the sulfide solid electrolyte material containing cross-linking sulfur is advantageous in that hydrogen sulfide is easily generated and Li contained therein is easily dissolved in a process solution. Particularly, in the present invention, the sulfide solid electrolyte material is preferably $Li_7P_3S_{11}$ from the viewpoint of high Li ion conductivity. It is to be noted that $Li_7P_3S_{11}$ is a sulfide glass ceramics of a $Li_2S$—$P_2S_5$ compound. Further, in the present invention, the sulfide solid electrolyte material is preferably a thio-LISICON-type compound, for example, a compound represented by $Li_aP_bGe_cS_d$ ($2.8 \leq a \leq 4.2$, $0.1 \leq b \leq 1.2$, $0.1 \leq c \leq 1.2$, $3 \leq d \leq 5$). The average particle size of the sulfide solid electrolyte material is preferably in the range of, for example, 1 nm to 100 µm, and particularly preferably in the range of 10 nm to 30 µm.

Examples of the anode active material include a metal-based active material and a carbon-based active material. Specific examples of the metal-based active material include In, Al, Si, and Sn. Specific examples of the carbon-based active material include mesocarbon microbeads (MCMB), high-orientation graphite (HOPG), hard carbon, and soft carbon. Examples of the conductive material include acetylene black and carbon fiber.

Hereinbelow, the structure of the battery member to be used in the present invention will be described. The structure of the battery member is not particularly limited as long as the above-described cathode active material and sulfide solid electrolyte material are contained therein. As one example of the structure of the battery member, one having at least a cathode active material layer containing a cathode active material and a sulfide solid electrolyte material can be mentioned. Specific examples of such a member include one constituted from only a cathode active material layer, one constituted from a cathode active material layer and a solid electrolyte layer, and one constituted from a cathode active material layer, a solid electrolyte layer, and an anode active material layer. It is to be noted that in this case, the solid electrolyte layer may be a layer containing a sulfide solid electrolyte material or a layer not containing a sulfide solid electrolyte material. On the other hand, as another example of the structure of the battery member, one having at least a cathode active material layer containing a cathode active material and a sulfide solid electrolyte layer containing a sulfide solid electrolyte material can be mentioned. Specific examples of such a member include one constituted from a cathode active material layer and a sulfide solid electrolyte material layer and one constituted from a cathode active material layer, a sulfide solid electrolyte layer, and an anode active material layer. It is to be noted that in each of the battery member structures mentioned above, at least one of the cathode active material layer and the anode active material layer may contain the above-described conductive material.

As described above, the battery member to be used in the present invention is not particularly limited as long as it contains a cathode active material and a sulfide solid electrolyte material. Further, part of a solid-state battery element constituted from a cathode active material layer, a solid electrolyte layer, and an anode active material layer may be brought into contact with a process solution, or the entire solid-state battery element may be brought into contact with a process solution. Further, the shape of the battery member is not particularly limited, and the battery member may be in the form of, for example, pellet or powder. However, the battery member is preferably in the form of powder. This makes it possible to increase the area of contact between the battery member and a process solution, thereby enabling the Li contained in a sulfide solid electrolyte material to be efficiently dissolved in the process solution.

(2) Process Solution

A process solution to be used in the present invention reacts with a sulfide solid electrolyte material contained in a battery member so that Li contained in the sulfide solid electrolyte material is dissolved in the process solution. As such a process solution, a protonic polar solvent can be mentioned by way of example. Specific examples of the protonic polar solvent include water, ethanol, methanol, and acetone. It is to be noted that a mixture of two or more of these protonic polar solvents may be used as a reaction solution. In the present invention, the process solution is preferably selected from the viewpoints of, for example, high reactivity with a sulfide solid electrolyte material, low reactivity with a cathode active material, and high volatility. Particularly, in the present invention, the process solution preferably contains water, and is more preferably composed of only water. This makes it easy to handle the process solution and to dissolve the Li contained in a sulfide solid electrolyte material.

(3) Method for Bringing Battery Member into Contact with Process Solution

According to the present invention, a battery member is brought into contact with a process solution to generate hydrogen sulfide as well as to dissolve the Li contained in a sulfide solid electrolyte material in the process solution. An example of a method for bringing a battery member into contact with a process solution includes a method in which a battery member is immersed in a process solution (immersion method). Such an immersion method can achieve a large area of contact between a battery member and a process solution, and therefore the Li contained in a sulfide solid electrolyte material can be efficiently dissolved in the process solution. In the case of the immersion method, the process solution is preferably stirred. This makes it possible to further promote the reaction between the battery member and the process solution. Another example of a method for bringing a battery member into contact with a process solution includes a method in which a process solution is sprayed onto a battery member (spray method). The spray method is advantageous in that it is more suitable for continuous processing than the immersion method. For example, continuous processing of a battery member can be achieved by fixing spray nozzles and moving the battery member in a horizontal direction. Further, a filtration step can also be performed concurrently with this step by placing a battery member on a filter and spraying a process solution onto the battery member. It is to be noted that in the present invention, the battery member may be brought into contact with a heated process solution. This makes it possible to efficiently dissolve the Li contained in a sulfide solid electrolyte material in the process solution.

2. Cathode Active Material Recovery Step

Hereinbelow, a cathode active material recovery step of the method according to the present invention will be described. This step is a step of recovering the cathode active material as an insoluble component from the process solution containing the Li dissolved therein. As a specific example of a method for recovering the insoluble component from the process solution, a filtration method can be mentioned. In a case where a solid residue obtained by filtration contains only a cathode active material, the cathode active material can be recovered by collecting the solid residue. On the other hand, in a case where a solid residue obtained by filtration contains not only a cathode active material but also another component, only the cathode active material is preferably recovered. Examples of another component include a conductive material and an anode active material. Further, there is also a possibility that the solid residue contains, as another component, an insoluble component derived from a sulfide solid electrolyte material. In this case, for example, a method utilizing a difference in specific gravity can be used to recover the cathode active material from the solid residue. Specific examples of such a method utilizing a difference in specific gravity include air classification, sedimentary classification, and centrifugal classification. Among them, air classification is preferred. This makes it possible to recover a highly-pure cathode active material. It is to be noted that in the present invention, the solid residue may be washed and dried.

3. Li Compound Recovery Step

Hereinbelow, a Li compound recovery step of the method according to the present invention will be described. This step is a step of recovering a Li compound from the process solution, from which the cathode active material as an insoluble component is recovered. An example of a method for recovering a Li compound from the process solution includes a method in which a solvent of the process solution is removed by drying. The kind of Li compound to be recovered is different depending on the kind of sulfide solid electrolyte material used. For example, in a case where a $Li_2S$—$P_2S$ compound is used as a sulfide solid electrolyte material, Li and P are dissolved in the process solution so that $Li_3PO_4$ is recovered as a Li compound. In a case where the above-mentioned $Li_aP_bGe_cS_d$ compound is used as a sulfide solid electrolyte material, Li, P, and Ge are dissolved in the process solution so that $Li_3PO_4$ and $Li_4GeO_4$ are recovered as Li compounds.

Further, there is a case where the process solution, from which the cathode active material as an insoluble component has been recovered, contains not only a target Li compound but also impurities such as phosphoric acid. In this case, if necessary, purification treatment is preferably performed. In the present invention, a general purification technique such as recrystallization, reprecipitation, or column chromatography can be employed. Further, as described above, there is a case where two or more Li compounds are generated depending on the kind of sulfide solid electrolyte material used. In this case, if necessary, separation treatment is preferably performed. In the present invention, a general separation technique such as one utilizing a difference in specific gravity can be employed. Specific examples of such a technique utilizing a difference in specific gravity include air classification, sedimentary classification, and centrifugal classification.

4. Hydrogen Sulfide Recover Step

Hereinbelow, a hydrogen sulfide recover step of the method according to the present invention will be described. This step is a step of recovering hydrogen sulfide generated in the contact step. By recovering gas-phase hydrogen sulfide, it is possible to further improve the recovery rates of useful components. More specifically, by performing not only the cathode active material recovery step and the Li compound recovery step but also the hydrogen sulfide recovery step, it is possible to achieve solid-phase recovery (recovery of a cathode active material), liquid-phase recovery (recovery of a Li compound), and gas-phase recovery (recovery of hydrogen sulfide) at one time.

In the present invention, recovered hydrogen sulfide may be stored as it is or used to synthesize another compound. However, the method according to the present invention preferably further includes the step of synthesizing lithium sulfide ($Li_2S$) from recovered hydrogen sulfide. This makes it possible to obtain lithium sulfide useful as a raw material of a sulfide solid electrolyte material. More specifically, lithium sulfide ($Li_2S$) can be synthesized by reacting recovered hydrogen sulfide with lithium hydroxide (LiOH) in an aprotic solvent.

Examples of the aprotic solvent include amide compounds, lactam compounds, urea compounds, organosulfur compounds, and cyclic organophosphorus compounds. Among these aprotic solvents, in the present invention, N-alkylcaprolactam or N-alkylpyrrolidone is preferably used, and N-methylpyrrolidone (NMP) is more preferably used. Further, by reacting hydrogen sulfide with lithium hydroxide at a reaction temperature of 150 to 200° C., it is possible to directly synthesize $Li_2S$ from them. Alternatively, the reaction between hydrogen sulfide and lithium hydroxide may be performed at a reaction temperature of 0 to 150° C. In this case, lithium hydrosulfide (LiSH) is first synthesized from hydrogen sulfide and lithium hydroxide, and then $Li_2S$ is synthesized from lithium hydrosulfide by increasing the reaction temperature to 150 to 200° C. This is described in detail in JP-A No. Hei 7-330312.

Figure 2:
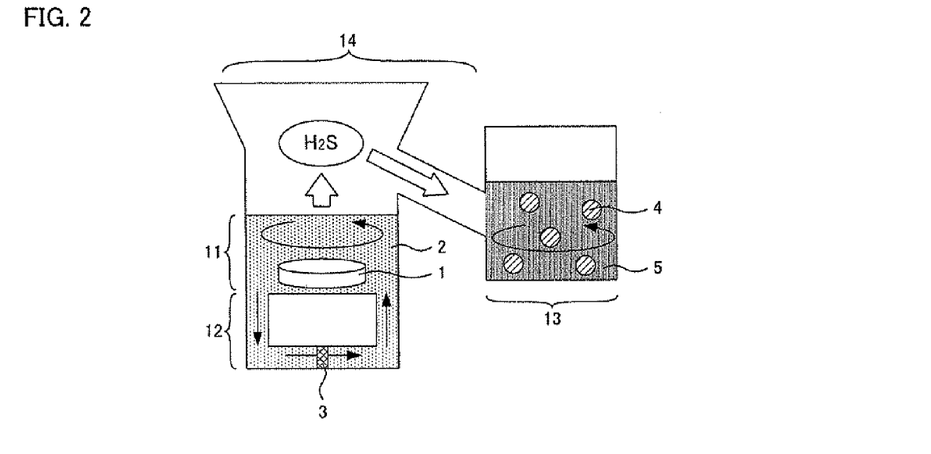
FIG. 2 is a schematic sectional view illustrating one example of a method for processing a battery member including a hydrogen sulfide recovery step.

FIG. 2 is a schematic sectional view illustrating one example of a method for processing a battery member comprising a hydrogen sulfide recovery step. A battery member 1 shown in FIG. 2 has a cathode active material layer composed of $LiCoO_2$, a sulfide solid electrolyte layer composed of $Li_7P_3S_{11}$, and an anode active material layer composed of graphite. An apparatus shown in FIG. 2 comprises an immersion unit 11 filled with water as a process solution 2 in which the battery member 1 is to be immersed, a cathode active material recovery unit 12 which recovers a cathode active material ($LiCoO_2$) as an insoluble component from the process solution 2 contained in the immersion unit 11 with the use of a filter 3, a hydrogen sulfide recovery unit 13 which recovers hydrogen sulfide ($H_2S$) generated by the reaction between the process solution 2 and the battery member 1, and a connection unit 14 which connects the immersion unit 11 with the hydrogen sulfide recovery unit 13. Further, the hydrogen sulfide recovery unit 13 has lithium hydroxide 4 and NMP as an aprotic solvent 5. It is to be noted that hydrogen sulfide is heavier than air, and therefore the connection unit 14 is configured to be able to achieve downward substitution.

As shown in FIG. 2, the battery member 1 is immersed and stirred in the process solution 2 to generate hydrogen sulfide as well as to dissolve Li contained in $Li_7P_3S_{11}$ in the process solution. Hydrogen sulfide generated is introduced through the connection unit 14 into the hydrogen sulfide recovery unit 13. The hydrogen sulfide introduced and the lithium hydroxide 4 are stirred in the aprotic solvent 5 heated to a temperature in the range of 150 to 200° C. to obtain $Li_2S$. On the other hand, a mixture of $LiCoO_2$ and graphite is recovered from a solid residue remaining on the filter 3. The mixture is air-classified to separate $LiCoO_2$ and graphite from each other to recover $LiCoO_2$. Further, the process solution 2, from which the solid residue has been removed, is dried to remove a solvent to recover $Li_3PO_4$.

Figure 3:
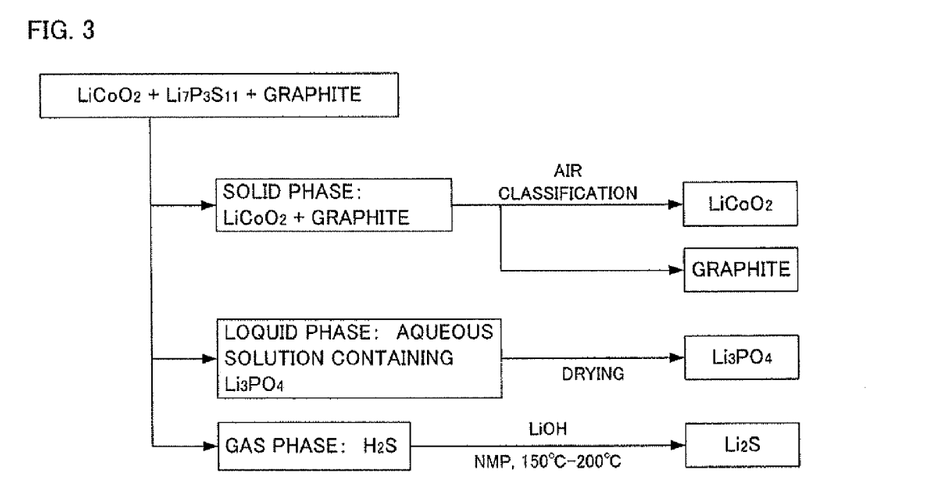
FIG. 3 is a process flow chart of the method for processing a battery member shown in FIG. 2.

FIG. 3 is a process flow chart of the method for processing a battery member shown in FIG. 2. As shown in FIG. 3, by performing not only the cathode active material recovery step and the Li compound recovery step but also the hydrogen sulfide recovery step, it is possible to achieve solid-phase recovery (recovery of a cathode active material), liquid-phase recovery (recovery of a Li compound), and gas-phase recovery (recovery of hydrogen sulfide) at one time.

5. Others

The method for processing a battery member according to the present invention may further include an additional step other than the above steps. For example, a step of charging a solid-state battery element may be performed before the contact step. By charging a solid-state battery element being in a discharge state, it is possible to allow a cathode active material to absorb Li, thereby enabling a higher-quality cathode active material to be recovered. Further, as in the case described above, part of the charged solid-state battery element may be brought into contact with a process solution or the entire charged solid-state battery element may be brought into contact with a process solution. Further, the method for processing a battery member according to the present invention may further include, before the contact step, a step of grinding a battery member to powder and/or a step of removing organic matter from a battery member by heating.

B. Method for Producing Regenerated Cathode Active Material

Hereinbelow, a method for producing a regenerated cathode active material according to the present invention will be described. The method for producing a regenerated cathode active material according to the present invention comprises the steps of: bringing a battery member containing at least a Li-containing cathode active material and a Li-containing sulfide solid electrolyte material into contact with a process solution to generate hydrogen sulfide as well as to dissolve the Li contained in the sulfide solid electrolyte material in the process solution; and recovering the cathode active material as an insoluble component from the process solution containing the Li dissolved therein to obtain a regenerated cathode active material.

According to the present invention, a battery member is brought into contact with a process solution, which makes it possible to dissolve the Li contained in the sulfide solid electrolyte material in the process solution without dissolving the Li contained in the cathode active material in the process solution. This makes it possible to efficiently separate the cathode active material and the sulfide solid electrolyte material from each other, thereby enabling a regenerated cathode active material to be efficiently obtained. It is to be noted that the contact step and the cathode active material recovery step of the method for producing a regenerated cathode active material according to the present invention are the same as those described above in "A. Method for Processing Battery Member", and therefore descriptions thereof are omitted here.

C. Apparatus for Processing Battery Member

Hereinbelow, an apparatus for processing a battery member according to the present invention will be described. The apparatus for processing a battery member according to the present invention is an apparatus for processing a battery member containing at least a Li-containing cathode active material and a Li-containing sulfide solid electrolyte material, which comprises an immersion unit filled with a process solution in which the battery member is to be immersed and a hydrogen sulfide recovery unit which recovers hydrogen sulfide generated by the reaction between the process solution and the battery member.

Since the apparatus for processing a battery member according to the present invention comprises an immersion unit and a hydrogen sulfide recovery unit, it is possible to efficiently separate a cathode active material and a sulfide solid electrolyte material from each other as well as to efficiently recover the cathode active material and the Li contained in the sulfide solid electrolyte material. Further, one example of the apparatus for processing a battery member according to the present invention is the same as that described above with reference to FIG. 2. Further, the immersion unit preferably has a stirring unit which stirs a process solution. Further, hydrogen sulfide generated in the immersion unit is preferably introduced into the hydrogen sulfide recovery unit without leakage to any other units.

It is to be noted that the present invention is not limited to the above-described embodiments. The embodiments are mere examples, and those having substantially the same structure as technical ideas described in the appended claims and providing similar effects are included in the scope of the present invention.

EXAMPLES

Hereinbelow, the present invention will be more specifically described with reference to the following examples.

Example 1

First, a solid-state battery element having a cathode active material layer, a sulfide solid electrolyte layer, and an anode active material layer provided in this order was prepared by pressing. Here, the cathode active material layer was formed using a mixture of 10.5 mg of a cathode active material ($LiCoO_2$) and 4.5 mg of a sulfide solid electrolyte material ($Li_7P_3S_{11}$), in which the $Li_7P_3S_{11}$ was synthesized by a method described in JP-A No. 2005-228570, the sulfide solid electrolyte layer was formed using 100 mg of $Li_7P_3S_{11}$, and the anode active material layer was formed using a mixture of 4 mg of an anode active material (graphite) and 4 mg of $Li_7P_3S_{11}$. Then, the thus obtained solid-state battery element was completely immersed in a process solution (water) and stirred. At this time, the generation of hydrogen sulfide was confirmed by measurement using a hydrogen sulfide detector (GBL-HS® manufactured by JIKCO Ltd). After a sufficient amount of hydrogen sulfide was generated, the process solution was filtered to obtain a solid residue (insoluble component). The solid residue containing $LiCoO_2$ and graphite was dried and then air-classified to separate $LiCoO_2$ and graphite from each other. Then, the process solution, from which the solid residue had been removed, was dried to obtain a solid-state liquid-phase product.

Figure 4A:
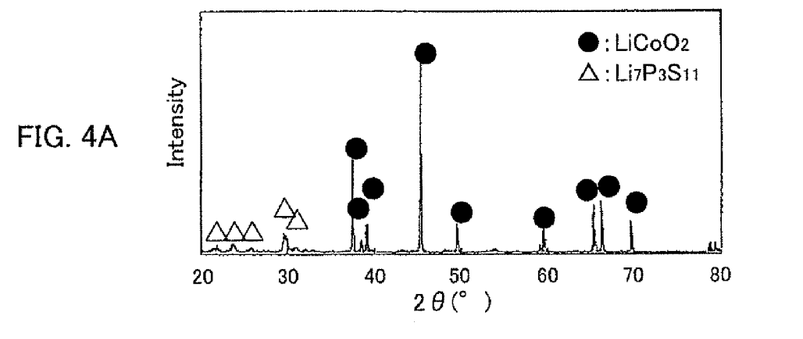
FIGS. 4A to 4C show the results of XRD measurement in Example 1.
Figure 4B:
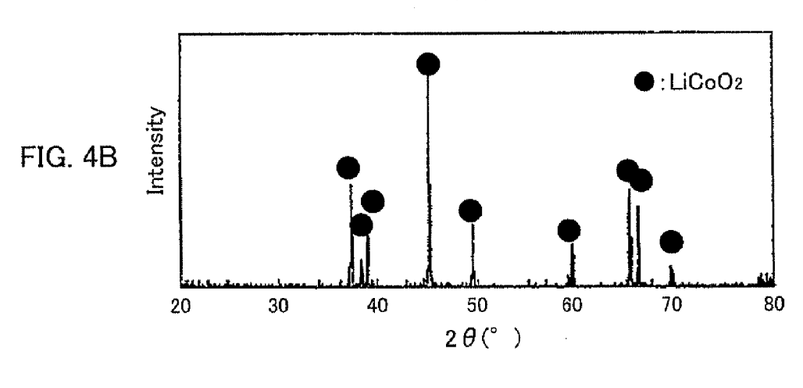
Figure 4C:
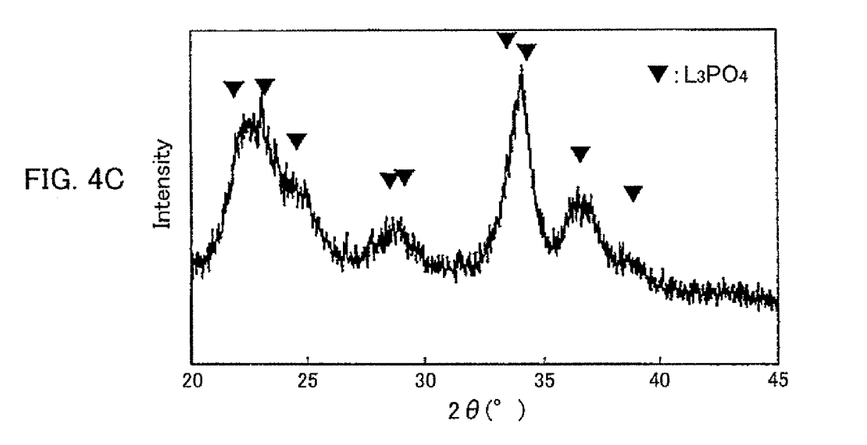
Figure 5:
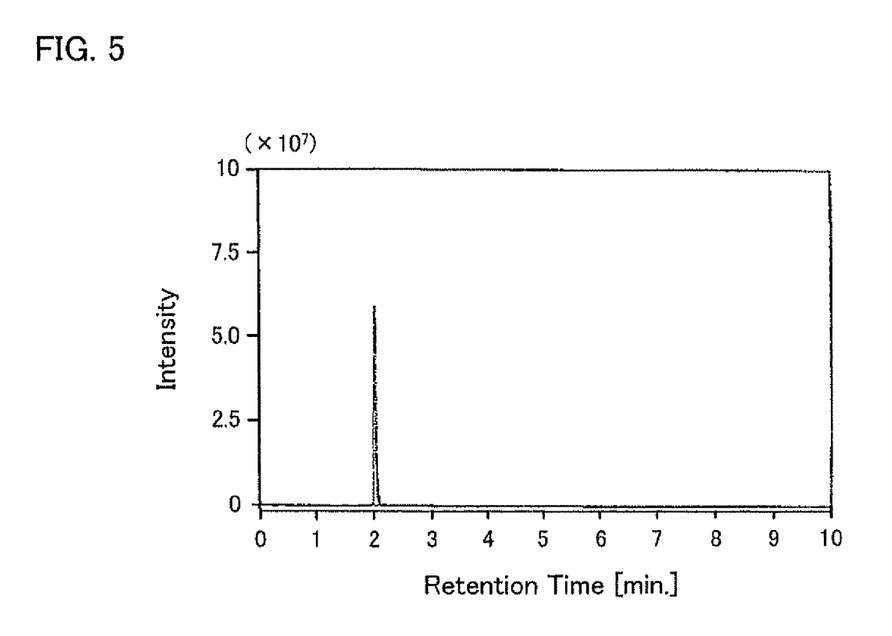
FIG. 5 shows the results of GC measurement in Example 1.

Then, the $LiCoO_2$ recovered from the solid residue and the liquid-phase product were measured by XRD. Further, a reference mixture obtained by mixing $LiCoO_2$ and $Li_7P_3S_{11}$ was measured by XRD as a reference. The measurement results are shown in FIGS. 4A to 4C. It is to be noted that FIG. 4A shows the result of XRD measurement of the reference mixture, FIG. 4B shows the result of XRD measurement of $LiCoO_2$ recovered from the solid residue, and FIG. 4C shows the result of XRD measurement of the liquid-phase product. In the case of the reference mixture, as shown in FIG. 4A, the peaks of both $LiCoO_2$ and $Li_7P_3S_{11}$ were detected. On the other hand, in the case of $LiCoO_2$ recovered from the solid residue, as shown in FIG. 4B, only the peak of $LiCoO_2$ was detected, and the peak of $Li_7P_3S_{11}$ was not detected. From the results, it has been found that Li contained in $Li_7P_3S_{11}$ is completely dissolved in water but Li contained in $LiCoO_2$ is not dissolved in water. Further, in the case of the liquid-phase product, as shown in FIG. 4C, the peak of $Li_3PO_4$ was detected. From the result, it has been found that Li contained in the sulfide solid electrolyte material ($Li_7P_3S_{11}$) can be recovered in the form of a Li compound ($Li_3PO_4$). Further, a gas generated by immersing the solid-state battery element in water was measured by gas chromatography (GC). As a result, as shown in FIG. 5, only the peak of hydrogen sulfide was detected. From the result, it has been found that only hydrogen sulfide was generated.

Example 2

A solid-state battery element was obtained in the same manner as in Example 1 except that $Li_{3.25}P_{0.75}Ge_{0.25}S_4$ was used as a solid electrolyte material. Further, $LiCoO_2$ was recovered from a solid residue in the same manner as in Example 1 and a liquid-phase product was obtained in the same manner as in Example 1. The $LiCoO_2$ recovered from a solid residue was measured by XRD, and as a result, no peaks other than the peak of $LiCoO_2$ were observed. The liquid-phase product was also measured by XRD, and as a result the peaks of $Li_3PO_4$ and $Li_4GeO_4$ were detected. Further, the liquid-phase product was measured by GC, and as a result, only the peak of hydrogen sulfide was detected.

The invention claimed is:

1. A method for processing a battery member containing at least a Li-containing cathode active material and a Li-containing sulfide solid electrolyte material, the method comprising the steps of:
   bringing the battery member into contact with a process solution to generate hydrogen sulfide as well as to dissolve the Li contained in the sulfide solid electrolyte material in the process solution;
   recovering the cathode active material as an insoluble component from the process solution containing Li dissolved therein; and
   recovering a Li compound from the process solution, from which the cathode active material as the insoluble component is recovered.

2. The method for processing a battery member according to claim 1, wherein the contact step is performed by immersing the battery member in the process solution.

3. The method for processing a battery member according to claim 1, further comprising a step of recovering hydrogen sulfide generated in the contact step.

4. The method for processing a battery member according to claim 3, wherein the hydrogen sulfide recovery step is a step of recovering the hydrogen sulfide as lithium sulfide.

5. The method for processing a battery member according to claim 1, wherein the process solution is water.

6. The method for processing a battery member according to claim 1, wherein the sulfide solid electrolyte material is a $Li_2S$—$P_2S_5$ compound.

7. The method for processing a battery member according to claim 1, wherein the sulfide solid electrolyte material contains Li and P, the process solution contains water, and the Li compound recovery step is a step for drying the process solution which recovers the cathode active material as the insoluble component and recovering the Li compound containing $Li_3PO_4$.

8. The method for processing a battery member according to claim 1, wherein the battery member is a cathode active material layer containing the cathode active material and the sulfide solid electrolyte material.

9. The method for processing a battery member according to claim 1, wherein the battery member is a member having a cathode active material layer containing the cathode active material, a sulfide solid electrolyte layer containing the sulfide solid electrolytematerial, and an anode active material layer containing an anode active material.

10. A method for producing a regenerated cathode active material, comprising the steps of:
    bringing a battery member containing at least a Li-containing cathode active material and a Li-containing sulfide solid electrolyte material into contact with a process solution to generate hydrogen sulfide as well as to dissolve the Li contained in the sulfide solid electrolyte material in the process solution; and
    recovering the cathode active material as an insoluble component from the process solution containing Li dissolved therein to obtain a regenerated cathode active material.

11. An apparatus for processing a battery member containing at least a Li-containing cathode active material and a Li-containing sulfide solid electrolyte material, the apparatus comprising:

an immersion unit filled with a process solution in which the battery member is to be immersed; and a hydrogen sulfide recovery unit which recovers a hydrogen sulfide generated by reaction between the process solution and the battery member.

12. The apparatus for processing a battery member according to claim 11, wherein the hydrogen sulfide recovery unit has lithium hydroxide and an aprotic solvent.

13. The apparatus for processing a battery member according to claim 11, comprising a connection unit which connects the immersion unit and the hydrogen sulfide recovery unit, wherein the hydrogen sulfide recovery unit recovers the generated hydrogen sulfide by downward substitution.

* * * * *